United States Patent [19]

Lundberg et al.

[11] 4,412,028

[45] Oct. 25, 1983

[54] CONVERSION OF POLYMER SOLUTIONS INTO SOLIDS OR MORE VISCOUS SOLUTION

[75] Inventors: Robert D. Lundberg, Bridgewater; Robert R. Phillips, Spring Lake Heights, both of N.J.; Lee A. McDougall, Houston, Tex.

[73] Assignee: Exxon Research and Engineering Co., Florham Park, N.J.

[21] Appl. No.: 335,450

[22] Filed: Dec. 29, 1981

[51] Int. Cl.$^3$ .............................. C08K 5/01; C08K 5/07
[52] U.S. Cl. ................................... 524/364; 524/378; 524/390; 524/574; 525/387
[58] Field of Search ............... 524/574, 390, 364, 378; 525/387

[56] References Cited

U.S. PATENT DOCUMENTS

| | | | |
|---|---|---|---|
| 2,534,078 | 12/1950 | Strain | 525/387 |
| 2,771,458 | 11/1956 | Gilder et al. | 524/574 |
| 2,799,662 | 7/1957 | Ernst et al. | 524/574 |
| 3,214,252 | 10/1965 | Lehmacher | 524/390 |
| 3,776,872 | 12/1973 | Heij et al. | 525/387 |
| 4,322,329 | 3/1982 | Lundberg et al. | 524/390 |

OTHER PUBLICATIONS

Hackh's Chemical Dictionary, p. 355.

*Primary Examiner*—Joseph L. Schofer
*Assistant Examiner*—N. Sarofin
*Attorney, Agent, or Firm*—Richard E. Nanfeldt

[57] ABSTRACT

The present invention relates to a process for forming a gel having improved creep resistance at elevated temperatures and having a viscosity of at least about 100,000 cps which includes the steps forming a solvent system of an organic liquid and a water miscible cosolvent, the water miscible cosolvent being less than about 15 wt. % of the solvent system, a viscosity of the solvent system being less than about 1000 cps; dissolving a neutralized sulfonated polymer in the solvent system to form a solution, adding a free radical generating initiator to the solution at a concentration level of about 0.01 to about 1%, a concentration of the neutralized sulfonated polymer in the solution being about 0.5 to about 20 wt. %, a viscosity of the solution being less than about 20,000 cps; and adding under shear conditions about 5 to about 500 vol. % water to the solution having a viscosity less than about 20,000 cps, the water being immiscible with the solution and the water miscible cosolvent transferring from the solution phase to the water phase thereby causing the viscosity of said solution to increase from less than 20,000 cps to greater than 100,000 cps.

32 Claims, No Drawings

CONVERSION OF POLYMER SOLUTIONS INTO SOLIDS OR MORE VISCOUS SOLUTION

BACKGROUND OF THE INVENTION

1. Field of the Invention

The present invention relates to a process for forming a gel having improved creep resistance at elevated temperatures and having a viscosity of at least about 100,000 cps which includes the steps forming a solvent system of an organic liquid and a water miscible cosolvent, the water miscible cosolvent being less than about 15 wt. % of the solvent system, a viscosity of the solvent system being less than about 1000 cps; dissolving a neutralized sulfonated polymer in the solvent system to form a solution, adding a free radical generating initiator to the solution at a concentration level of about 0.01 to about 1 parts by weight per 100 parts of organic liquid, a concentration of the neutralized sulfonated polymer in the solution being about 0.5 to about 20 wt. %, a viscosity of the solution being less than about 20,000 cps; and adding under high shear conditions about 5 to about 500 vol. % water to the solution having a viscosity less than about 20,000 cps, the water being immiscible with the solution and the water miscible cosolvent transferring from the solution phase to the water phase thereby causing the viscosity of said solution to increase from less than 20,000 cps to greater than 100,000 cps.

2. Description of the Prior Art

There are many applications for very viscous or gelled solutions of polymers in organic liquids which are quite diverse. There are also a number of physical and chemical techniques for preparing such systems. The present invention is concerned with a process for converting a relatively low viscosity organic liquid solution of an ionic polymer into a very viscous or gelled system via a rapid process which under certain conditions can be reversed. The potential applications for this process and the products derived therefrom will be evident in the instant application.

There are major problems in the direct preparation of viscous polymer solutions or gels via conventional techniques such as polymer dissolution. For example, attempts to form a high viscosity (>500,000 cps) solution of polystyrene in a suitable solvent such as xylene can be difficult. The levels of polymer required are either very high (20 to 50 wt. % concentration) or the molecular weight of the polymer must be extremely high. In either event, the dissolution process is extremely slow even at elevated temperatures, and even then it is difficult to achieve homogeneous polymer solutions free of local concentrations of undissolved, or poorly dissolved polymer. Thus, the process of achieving such solutions can be difficult and the concentration of polymer in the solution to achieve high viscosities can be uneconomically high.

A number of U.S. patent applications have recently described the formation of gels of sulfonated polymers, but these gels display inferior creep resistance and differ from the instant invention in that they do not employ a free radical generating initiator. These U.S. patent applications are: Ser. Nos. 930,044; 106,027; 136,834; 136,835; 136,836; and 136,837.

One of the problems that has been observed with gels achieved by the routes described above is that at low sulfonate contents, the resulting gels display poor creep resistance over long periods of time and at elevated temperatures. This flow behavior is what would be predicted when one employs a polymer of low sulfonate content, employed at low concentrations, and activated with water. The number of physical crosslinks which are present are insufficient to sustain permanent crosslinking and flow occurs. This problem is especially severe at elevated temperatures (>100° C.). These observations are consistent with continued flow of ionomer gels under stress, especially at high temperature.

This invention describes an approach to create ionomer gels of radically improved stability both at high temperature and over long periods of time. This invention embodies a combination of a free radical-generating initiator in solution, preferably with the ionic polymer plus the use of a water miscible cosolvent. This entire combination is interacted with an aqueous solution accompanied by shear. The resulting mixture sets-up either to a more viscous solution or a solid gel. In the absence of free-radical initiators, gels occur as previously described. In the presence of benzoyl peroxide it has been observed that the gelation occurs much more rapidly at much lower water contents, resulting in an extremely creep resistant solid gel. The resulting solid appears to resist stress to an unexpected degree. The surprising observation in this invention is that the combination of peroxide and ionomer solution is activated by the addition of water at very low temperatures, substantially lower than would have been anticipated based on our knowledge of peroxide decomposition temperatures.

There appears to be little doubt that the peroxide is activating a crosslinking mechanism which is synergistically interacting with the ionic crosslinking normally expected. Irrespective of the mechanism for this process it is apparent that the resulting gelation displays the highly coveted characteristics of extreme creep resistance.

There are various chemical approaches to the solution of the problems outlined above, that is polymer chain lengthening reactions which can occur to give viscous solutions such as by the reaction of hydroxyl terminated polymers with diisocyanates etc. Such processes have inherent disadvantages which preclude their use in the intended applications of this invention.

The instant invention describes a process which permits (1) the preparation of polymer solutions of sulfonated polymers in organic liquid having reasonably low viscosities (i.e., less than about 20,000 cps); and (2) the preparation of gels from such solutions by the simple process of mixing water with the polymer solution. These operations are achieved by the use of the appropriate concentration of polymers having low concentrations of ionic groups present, preferably metal sulfonate groups. Such polymers are described in detail in a number of U.S. patents (U.S. Pat. Nos. 3,836,511; 3,870,841; 3,847,854; 3,642,728; 3,921,021) which are herein incorporated by reference. These polymers possess unusual solution characteristics some of which are described in U.S. Pat. No. 3,931,021. Specifically, such polymers such as lightly sulfonated polystyrene containing about 2 mole % sodium sulfonate pendant to the aromatic groups are typically not soluble in solvents commonly employed for polystyrene itself. However, the incorporation of modest levels of polar cosolvents permit the rapid dissolution of such ionic polymers to form homogeneous solutions of moderate viscosity.

In the instant process, the role of the polar cosolvent is that of solvating the ionic groups while the main body of the solvent interacts with the polymer backbone. For example, xylene is an excellent solvent for the polystyrene backbone and when combined with 5% methanol readily and rapidly will dissolve the previous example of lightly sulfonated polystyrene.

The remarkable and surprising discovery of the instant invention pertains to the following observation.

When small (or large) amounts of water are combined and mixed under high shear solutions of ionic polymers and a free radical generating initiator dissolved in such mixed solvent systems as those described above, it is possible to convert such low viscosity systems into extremely viscous gels or solutions having high creep resistance at elevated temperatures. Indeed it is possible to achieve increases in viscosity by factors of $10^4$ (10,000) or more by the addition of only 5 to 15% water based on the polymer solution volume.

This unusual behavior is postulated to arise from the removal of the polar cosolvent from the polymer solution phase into a separate aqueous phase. Consequently, when this occurs, the physical crosslinking of the ionic groups is again manifested resulting in a tremendous increase in solution viscosity. The resulting gels appear quite homogeneous.

SUMMARY OF THE INVENTION

The present invention relates to a process for forming a gel having improved creep resistance at elevated temperature and a viscosity of at least about 100,000 cps which includes the steps forming a solvent system of an organic liquid and a water miscible cosolvent, the water miscible cosolvent being less than about 15 wt. % of the solvent system, a viscosity of the solvent system being less than about 1000 cps; dissolving a neutralized sulfonated polymer in the solvent system to form a solution, adding to the solution a free radical generating initiator at a concentration level of about 0.01 to about 1 part per 100 parts of organic liquid, a concentration of the neutralized sulfonated polymer in the solution being about 0.3 to about 20 wt. %, a viscosity of the solution being less than about 20,000 cps; and adding under high shear about 5 to about 500 vol. % water to the solution having a viscosity less than about 20,000 cps, the water being immiscible with the solution and the water miscible cosolvent transferring from the solution phase to the water phase thereby causing the viscosity of said solution to increase rapidly from less than 20,000 cps to greater than 50,000 cps.

Accordingly, it is an object of the instant invention to describe an economical process for forming a gelled polymeric solution having improved creep resistance at elevated temperatures and a viscosity greater than about 100,000 cps, preferably greater than 1,000,000 cps.

A further object of the instant invention is to provide a process for forming a gel which can be used as an encapsulating material, a coating material, as a means of forming a plug within a bore of an elongated member, as a means of filling an opening in an article, sewer grouting or in water shut off applications. In addition, this technique can be employed as an approach to join lubricating gels or greases which display a significant resistant to flow.

A still further object of the instant invention is to employ the instant process as an integral part of well control procedures which are initiated when unwanted bore fluid influxes have entered the wellbore from subterranean formations. A thin fluid solution, separated from the water base drilling mud by suitable fluid spacers, could be circulated down the drill pipe string and out through the jet nozzles in the drill bit. Upon contacting water in the drill pipe-formation annulus, a viscous gel would be formed that could prevent further bore fluid movement and avoid the risk of a catastrophic well blowout. This type of procedure would have several advantages over current, conventional well control methods which rely on the hydrostatic gradient of a heavy fluid placed in the annulus to control the well in the event of pore fluid influxes.

GENERAL DESCRIPTION

The present invention relates to a process for forming a gel having improved creep resistance at elevated temperatures and a viscosity of at least about 100,000 cps which includes the steps of forming a solvent system of an organic liquid and a water miscible cosolvent, the water miscible cosolvent being less than about 15 wt. % of the solvent system, a viscosity of the solvent system being less than about 1000 cps; dissolving a neutralized sulfonated polymer in the solvent system to form a solution, adding to the solution a free radical generating initiator at a concentration level of about 0.01 to about 1.0 parts per 100 parts of organic liquid, a concentration of the neutralized sulfonated polymer in the solution being about 0.5 to about 20 wt. %, a viscosity of the solution being less than about 20,000 cps; and adding, under high shear, about 5 to about 500 vol. % water to the solution having a viscosity less than about 20,000 cps, the water being immiscible with the solution and the water miscible cosolvent transferring from the solution phase to the water phase thereby causing the viscosity of said solution to increase rapidly from less than 20,000 cps to greater than 100,000 cps, more preferably greater than 1,000,000 cps.

If the boiling point of the organic liquid is greater than that of the water or the water miscible cosolvent, the gel having a viscosity greater than 100,000 cps can be heated to a temperature greater than the boiling point of the water and the water miscible cosolvent but less than that of the organic liquid thereby isolating a gel of the neutralized sulfonated polymer in the organic liquid, when the water miscible cosolvent and water are boiled off. The formed gel can be further heated to a temperature above the boiling point of the organic liquid thereby removing part of the organic liquid from the liquid so as to cause formation of a more rigid gel. Alternatively, the solution having a viscosity greater than 100,000 cps can be heated to a temperature above the boiling point of the organic liquid, water miscible cosolvent and water thereby removing the organic liquid water and polar solvent from said gel so as to cause formation of the solid neutralized sulfonated polymer. The gel can be coated onto a substrate of an article such as a cloth fabric, a polymeric material, glass, ceramic, metal or wood prior to the heating of the gel. When the gel is subsequently heated, a solid neutralized sulfonated polymeric coating will form on the surface of the substrate. Alternatively, the gel could be placed into an opening of the article thereby forming a solid plug within the opening upon application of heat to the gel. The gel could also be placed into the bore of an elongated member such as a pipe, thereby forming a plug in the pipe upon application of heat to the gel. The article could also be suspended in the solution having the viscosity of less than 20,000 cps and thereby be encapsulated in the solution having a viscosity greater than 100,000 cps, when the water is added to the solution having a viscosity of less than 20,000 cps.

When the solution having a viscosity greater than 100,000 cps is formed by the addition of water to the solution having a viscosity less than 20,000 cps, the water miscible cosolvent rapidly transfers from gel phase to the aqueous water which is immiscible with the solution phase. The water can be removed from the solution phase by conventional liquid extraction methods. The formation of the solution having a viscosity of >100,000 cps from the solution having a viscosity less than 20,000 cps can be quite rapid in the order of less than 1 minute to about 24 hours, more preferably less than 1 minute to about 30 minutes, and most preferably less than 1 minute to about 10 minutes, however, this depends on temperature, shear, solvent type, etc.

The component materials of the instant process generally include an ionomeric polymer such as a neutralized sulfonated polymer, a free radical generating initiator, and organic liquid, water miscible solvent, and water.

In general, the ionomeric polymer will comprise from about 10 to about 200 meq. pendant ionomeric groups per 100 grams of polymer, more preferably from 10 to 100 meq. pendant ionomeric groups. The ionic groups may be conveniently selected from the group consisting of carboxylate, phosphonate, and sulfonate, preferably sulfonate groups. The ionomers utilized in the instant invention are neutralized with the basic materials selected from the group consisting of Groups IA, IIA, IB, and IIB of the Periodic Table of the Elements and lead, tin, and antimony, as well as ammonium and amine counterions. Ionic polymers which are subject to the process of the instant invention include both plastic and elastomeric polymers with the requirement that those sulfonated polymers possess some residual unsaturation which can react with a free radical source. Specific polymers include sulfonated ethylene propylene terpolymers, sulfonated Butyl rubber, sulfonated polybutadiene, sulfonated polyisoprene, sulfonated styrene/butadiene rubber, copolymers of sulfonate-containing monomers with other monomers such as butadiene isoprene, etc. or terpolymers of such systems, as long as the resulting polymers have residual unsaturation capable of reacting with free radicals.

Neutralization of the cited polymers with appropriate metal hydroxides, metal acetates, metal oxides or ammonium hydroxide etc. can be conducted by means well known in the art. For example, the sulfonation process as with butyl rubber containing a small 0.3 to 1.0 mole % unsaturation can be conducted in a suitable solvent such as toluene with acetyl sulfate as the sulfonating agent such as described in U.S. Pat. No. 3,836,511, herein incorporated by reference. The resulting sulfonic acid derivative can then be neutralized with a number of different neutralization agents such as sodium phenolate and similar metal salts. The amounts of such neutralization agents employed will normally be equal stoichiometrically to the amount of free acid in the polymer plus any unreacted reagent which still is present. It is preferred that the amount of neutralizing agent be equal to the molar amount of sulfonating agent originally employed plus 10% more to insure full neutralization. The use of more of such neutralization agent is not critical. Sufficient neutralization agent is necessary to effect at least 50% neutralization of the sulfonic acid groups present in the polymer, preferably at least 90%, and most preferably essentially complete neutralization of such acid groups should be effected.

The degree of neutralization of said ionomeric groups may vary from 50 to 500 mole %, preferably 90 to 200%. Most preferably, it is preferred that the degree of neutralization be substantially complete, that is with no substantial free acid present and without substantial excess of the base other than that needed to insure neutralization. Thus, it is clear that the polymers which are utilized in the instant invention comprise substantially neutralized pendant groups and, in fact, an excess of the neutralizing material may be utilized without defeating the objects of the instant invention.

The ionomeric polymers of the instant invention may vary in number average molecular weight, as measured by GPC, from 1,000 to 10,000,000, preferably from 5,000 to 500,000, most preferably from 10,000 to 200,000. These polymers may be prepared by methods known in the art; for example, see U.S. Pat. No. 3,642,728, hereby incorporated by reference.

It is evident that the polymers covered within this invention encompass a broad class of hydrocarbon polymer systems. It is important that these hydrocarbon polymer backbones (in the absence of the ionic groups) be soluble in the organic liquid whose viscosity is to be controlled. To achieve the desired solubility, it is required that the polymer to be employed possess a degree of polarity consistent with that solvent. This solubility relationship can readily be established by anyone skilled in the art simply by appropriate texts (e.g., Polymer Handbook, Edited by Brandrup and Emmergut, Interscience Publishers, 1967, section IV-341). In the absence of appropriate polymer solvent compatibility knowledge, this can be determined experimentally by observing whether the selected polymer will be soluble in the solvent at a level of 1 gm. polymer per 100 ml solvent. If the polymer is soluble, then this demonstrates that it is an appropriate backbone for modification with ionic groups to achieve the objectives of this invention. It is also apparent that polymers which are too polar will not be soluble in the relatively non-polar organic liquids of this invention. Therefore, only those polymer backbones (i.e., as measured in the absence of ionic groups) having a solubility parameter less than 10.5 are suitable in this invention. This precludes the use of such polymers as polyvinyl alcohol, polyacrylonitrile, etc. Also highly crystalline polymers are to be avoided since they tend not to be soluble in the relatively nonpolar organic liquids employed herein. Therefore, acceptable polymers employed in this invention must possess a level of crystallinity of less than 25%. Thus, these acceptable polymers can be considered substantially non-crystalline.

The preferred ionic copolymers for use in the instant invention, e.g., sulfonated EPDM terpolymers, may be prepared by the procedures described in U.S. Pat. Nos. 3,642,728 and 3,836,511, hereby incorporated by reference.

The ionomeric polymers may be incorporated into the organic liquid at a level of from 0.5 to 20 weight % preferably from 0.5 to 10 weight %, most preferably from 0.5 to 5 weight % based on the organic liquid and the water miscible cosolvent.

Specific examples of preferred ionomeric polymers which are useful in the instant invention include sulfonated ethylene propylene terpolymers, sulfonated Butyl rubber, sulfonated polybutadiene, sulfonated polyisoprene, sulfonated styrene/butadiene rubber, copolymers of sulfonate-containing monomers with other monomers such as butadiene isoprene, etc. or terpolymers of such systems, as long as the resulting polymers have residual unsaturation capable of reacting with free radicals. Especially preferred is sulfonated EPDM terpolymers.

The ionomeric polymers of the instant invention may be prepared prior to incorporation into the organic solvent, or by neutralization of the acid form in situ. For example, preferably the acid derivative is neutralized immediately after preparation. For example, if the sulfonation of the EPDM terpolymer is conducted in solution, then the neutralization of that acid derivative can be conducted immediately following the sulfonation procedure. The neutralized polymer may then be isolated by means well-known to those skilled in the art; i.e., coagulation, steam stripping, or solvent evaporation, because the neutralized polymer has sufficient thermal stability to be dried for employment at a later time in the process of the instant invention. It is well known that the unneutralized sulfonic acid derivatives do not possess good thermal stability and the above operations avoid that problem.

It is also possible to neutralize the acid form of these polymers in situ; however, this is not a preferred operation, since in situ neutralization required preparation of the sulfonic acid in the organic liquid which is to be subjected to the instant process, or the acid form of the ionic polymer must be dissolved in said organic liquid. The latter approach may involve handling of an acid form of an ionic polymer which has limited thermal stability. Therefore, it is quite apparent that the preparation and isolation of a neutralized ionic polymer affords the maximum latitude in formulation, less problems in handling polymers of limited thermal stability and maximum control over the final mixture of ionic polymer, polar cosolvent and organic liquid.

The organic liquids, which may be utilized in the instant invention, are selected with relation to the ionic polymer and vice-versa. The organic liquid is selected from the group consisting essentially of aromatic hydrocarbons, ketones, chlorinated aliphatic hydrocarbons, aliphatic hydrocarbons, cyclic aliphatic ethers, aliphatic ethers, or organic aliphatic esters and mixtures thereof.

Specific examples of organic liquids to be employed with various types of polymers are:

| Polymer | Organic Liquid |
|---|---|
| sulfonated ethylene-propylene terpolymer | aliphatic and aromatic Oils such as Solvent "100 Neutral", "150 Neutral" and similar oils, benzene, diesel oil, toluene, xylene, ethyl benzene, pentane, hexane, heptane, octane, iso-octane, nonane, decane |
| sulfonated butyl rubber | saturated aliphatic hydrocarbons, diisobutylene, triisobutylene, aromatic and alkyl substituted aromatic hydrocarbons, chlorinated hydrocarbons, n-butyl ether, n-amyl ether, methyl, oleate, aliphatic oils, oils predominately paraffinic in nature and mixtures containing naphthenic hydrocarbons "Solvent 100 Neutral", |

| Polymer | Organic Liquid |
|---|---|
| | "Solvent 150 Neutral" and all related oils, low molecular weight polymeric oils such as squalene, white oils and process oils having 60% or less aromatic content |

The method of the instant invention includes incorporating a water miscible cosolvent, into the mixture of organic liquid and ionomer, to solubilize the pendant ionomeric groups. The water miscible cosolvent will have a solubility parameter of at least 10.0, more preferably at least 11.0 and is water miscible and may comprise from 0.1 to 40, preferably 0.5 to 20 weight % of the total mixture of organic liquid, ionomeric polymer, and water miscible cosolvent. The solvent system of water miscible cosolvent and organic liquid in which the neutralized sulfonated polymer is dissolved contains less than about 15 wt. % of the water miscible cosolvent, more preferably about 2 to about 10 wt. %, and most preferably about 2 to about 5 wt. %. The viscosity of the solvent system is less than about 1,000 cps, more preferably less than about 800 cps and most preferably less than about 500 cps.

Normally, the water miscible cosolvent will be a liquid at room temperature; however, this is not a requirement. It is preferred, but not required, that the water miscible cosolvent be soluble or miscible with the organic liquid at the levels employed in this invention. The water miscible cosolvent is selected from the group consisting essentially of water soluble alcohols, amines, di- or trifunctional alcohols, amides, acetamides, phosphates, or lactones and mixtures thereof. Especially preferred water miscible cosolvents are aliphatic alcohols such as methanol, ethanol, n-propanol, isopropanol, 1,2-propane diol, monomethyl ether of ethylene glycol, and n-ethylformamide.

To the solution of the neutralized sulfonated polymer, water miscible cosolvent, and the organic liquid is added about 0.1 to about 1 wt. %, more preferably about 0.02 to about 1 wt. %, and most preferably about 0.04 to about 0.5 wt. %, of a free radical generating initiator which is selected from the group consisting of hydrocarbon peroxides, nitriles, alkylperoxides, ketone peroxides and azobisisobutyronitriles. Especially preferred free radical generating initiators are benzoyl peroxide, t-butyl hydroperoxide and axobisisobutyronitrile.

EXAMPLE 1

To the prepared gels of Example 1 of Sulfo-EPDM (20 meq, sulfonate content Zn neut.,) which were made by adding water to 5.9% (7821-101) and 5% (7821-107) concentration solutions in 5% methanol/xylene while stirring with a high speed stirrer. The gels were prepared without and in the presence of initiators; benzoyl peroxide, t-butyl hydroperoxide and azobisisobutyronitrile at the various levels.

Brookfield viscosities of the gels were obtained immediately after gelation with the helipath stand and spindles. An increase in gel viscosity with initiator present was observed. The data and compositions are summarized in the attached Table I.

Gel viscosities can be measured with the Brookfield helipath stand and spindles up to 3,300,000 cps. Several gels obtained had viscosities above this range. To determine if gel strength measurements could be obtained by another method in order to compare gels with viscosities above this limit, and below as well, consistency determinations of the gels were obtained using a penetrometer and universal grease cone.

The procedure (ASTM-D-217, "Cone Penetration of Lubricating Grease") employed a Universal Penetrometer (Lab-Line, with 5 sec. timer) and a universal grease cone (magnesium body, stainless steel tip, weight 102.5 g). The gels were transferred from the sample jars to a powder funnel and tamped down to conform to the funnel shape. A cork was used to seal off the funnel and to provide a soft stop for the cone in case it penetrated through the sample. The funnel, supported by a jar, was placed on the penetrometer table and the cone was lowered until the tip just touched the surface of the gel. The cone was then released and allowed to penetrate 5 seconds as controlled by the penetrometer timer. Penetration (consistency) in mm was then read from the penetrometer dial.

The measured consistency compared well with gel strength as observed while transferring each gel sample to the funnel and tamping down to funnel shape.

For the most part, Brookfield viscosity and consistency are observed to be broadly comparable. Since viscosities were obtained immediately after gelation and consistency measurements obtained 16 days (7821-101) and 8 days (7821-107) after, it is probably that gel strengths have changed somewhat over this time period. Better comparisons should be obtained if viscosities and consistency measurements are obtained with as little time lapse between as possible.

It is evident from the data in Table 1 that the presence of peroxide induces a marked increase in viscosity consistent with a strengthening of the crosslinking in the gels. The peroxides with a higher temperature of decomposition appear less effective. It appears that a high level of an initiator which decomposes at low temperatures may result in the loss of gel strength. It is also apparent that the consistency values as determined by penetration are quite compatible with the viscosity values.

The amount of water added to the solution of neutralized sulfonated polymer free radical generating initiator, organic liquid and water miscible cosolvent having a viscosity of less than about 20,000 cps, is about 5 to about 500 vol. % of water, more preferably about 10 to about 300 vol. % water, and most preferably about 10 to about 200 vol. % water.

TABLE I

Gel Consistency as Measured by Cone Penetration
5% Sulfo EPDM (Zn Salt, 20 meq/100 g) in 5% MEOH/XYLENE

| Sample 7821 | Initiator[1] | % Initiator | Water[2] % | Brookfield[3] Viscosity, cps | Consistency[4] mm |
|---|---|---|---|---|---|
| 1 | None | — | 10 | >3,300,000 | 235 |
| 2 | None | — | 5 | 1,700,000 | 259 |
| 3 | Benzoyl Peroxide | 0.04 | 5 | >3,300,000 | 220 |
| 4 | Benzoyl Peroxide | 0.2 | 5 | >3,300,000 | 220 |
| 5 | None | — | 5 | 260,000 | 309 |
| 6 | t-butyl hydro Peroxide | 0.04 | 5 | 380,000 | 292 |
| 7 | t-butyl hydro Peroxide | 0.2 | 5 | 465,000 | 291 |
| 8 | Azobisisobutyronitrile | 0.04 | 5 | >3,300,000 | 228 |
| 9 | Azobisisobutyronitrile | 0.2 | 5 | 2,750,000 | 268 |
| 10 | Benzoyl Peroxide | 0.04 | 5 | 1,500,000 | 283 |
| 11 | Benzoyl Peroxide | 0.2 | 5 | >3,300,000 | 256 |
| 12 | Benzoyl Peroxide | 0.5 | 5 | >3,300,000 | 261 |

[1]Initiator added to polymer solution, dissolved by stirring 5 minutes.
[2]Water added while stirring polymer-initiator solution with high speed stirrer.
[3]Heli-path spindles. Measurement immediately after gelation.
[4]Measured (7821-101) 16 days after gelation; (7821-107) 8 days after gelation.

What is claimed is:

1. A process for forming a polymeric gel having improved creep resistance at elevated temperatures, a viscosity of at least about 100,000 cps which comprise the steps of:
   (a) forming a solvent system of an organic liquid, a free radical generating initiator, and a water miscible cosolvent, said polar cosolvent being less than about 15 wt. % of said solvent system, a viscosity of said solvent system being less than about 1,000 cps;
   (b) dissolving a neutralized sulfonated polymer in said solvent system to form a solution, a concentration of said neutralized sulfonated polymer in said solution being about 0.1 to about 10 wt. %, a viscosity of said solution being less than about 20,000 cps;
   (c) adding a free radical generating initiator to the solution at a level of about 0.01 to about 1%;
   (d) adding under high shear about 5 to about 500 volume % water to said solution, said water being immiscible with said solution, with said water miscible cosolvent transferring from said solution to said water causing the viscosity of said solution or suspension to increase from less than 20,000 cps to greater than 100,000 cps.

2. A process according to claim 1, wherein said organic liquid has a boiling point greater than said water miscible cosolvent or said water.

3. A process according to claim 2, further including the step of heating said solution having a viscosity greater than 100,000 cps to a temperature greater than the boiling point of said water and said water miscible cosolvent, but less than that of said organic liquid thereby isolating a gel of said neutralized sulfonated polymer in said organic liquid.

4. A process according to claim 3, further including heating said gel to a temperature above the boiling point of said organic liquid thereby removing said organic liquid from said gel to form a solid neutralized sulfonated polymer.

5. The product prepared by the process of claim 4.

6. A process according to claim 3, further including the step of depositing said gel on a substrate prior to heating said gel to said temperature above said boiling point of said organic liquid thereby forming a coating of said neutralized sulfonated polymer on said substrate.

7. A process according to claim 1 further including the step of heating said solution and said water to a temperature above the boiling points of said water, said water miscible cosolvent, and said organic liquid forming free neutralized sulfonated polymer.

8. A process according to claim 1, further including the step of separating said water from said solution having a viscosity greater than 50,000 cps thereby forming a gel of said neutralized sulfonated polyer in said organic liquid.

9. The product prepared by the process of claim 1.

10. The product prepared by the process of claim 8.

11. A process according to claim 8, further including suspending an article in said solution having a viscosity less than about 20,000 cps, thereby permitting said gel to be encapsulated within said substance having a viscosity greater than 100,000 cps upon the addition of said water to said solution having a viscosity less than about 20,000 cps.

12. The product prepared by the process of claim 11.

13. A process according to claim 1, further including an article having an opening therein and forming said solution having a viscosity greater than 100,000 cps within said opening.

14. A process according to claim 1, further including an elongated member having a bore therein and forming said solution having a viscosity greater than 500,000 cps within said bore.

15. A process according to claim 1, wherein said neutralized sulfonated polymer has about 10 to about 200 meq. of pendant $SO_3H$ groups per 100 grams of polymer.

16. A process according to claim 15, wherein said $SO_3H$ are neutralized within an ammonium or metal counterion.

17. A process according to claim 16, wherein said metal counterion is selected from the group consisting of antimony, tin, lead or Groups IA, IIA, IB or IIB of the Periodic Table of Elements.

18. A process according to claim 16, wherein said $SO_3H$ groups are at least 90 mole % neutralized.

19. A process according to claim 1, wherein said neutralized sulfonated polymer is formed from an elastomeric polymer.

20. A process according to claim 19, wherein said elastomeric polymer is selected from the group consisting of EPDM terpolymer and Butyl rubber.

21. A process according to claim 1, wherein said neutralized sulfonated polymer is formed from a thermoplastic.

22. A process according to claim 21, wherein said polymer is selected from the group consisting of sulfonated ethylene propylene terpolymers, sulfonated Butyl rubber, sulfonated polybutadiene, sulfonated polyisoprene, sulfonated styrene/butadiene rubber, copolymers of sulfonate-containing monomers with other monomers such as butadiene isoprene, etc. or terpolymers of such systems, as long as the resulting polymers have residual unsaturation capable of reacting with free radicals.

23. A process according to claim 1, wherein said neutralized sulfonated polymer further includes a filler admixed therewith.

24. A process according to claim 1, wherein said neutralized sulfonated polymer further includes sulfonated EPDM terpolymers and sulfonated butyl rubber systems.

25. A process according to claim 1, wherein said polar cosolvent has a greater polarity than said organic liquid.

26. A process according to claim 1, wherein said polar colsolvent is selected from the group consisting of aliphatic alcohols, aliphatic amines, di- or trifunctional aliphatic alcohols, water miscible amides, acetamides, phosphates, and lactones and mixtures thereof.

27. A process according to claim 1, wherein said polar cosolvent is selected from the group consisting of methanol, ethanol, propanol, isporopanol, and mixtures thereof.

28. A process according to claim 1, wherein said polar cosolvent has a solubility parameter of at least about 10 and is water miscible.

29. A process according to claim 1, wherein said organic liquid is selected from the group consisting of aromatic hydrocarbons, ketones, chlorinated aliphatic hydrocarbons, aliphatic hydrocarbons, cyclic aliphatic ethers, aliphatic ethers and organic aliphatic esters and mixtures thereof.

30. A process according to claim 1, wherein said organic liquid is selected from the group consisting of aliphatic hydrocarbons or aromatic hydrocarbons.

31. A process according to claim 1, wherein said free radical generating initiator is selected from the group consisting of hydrocarbon peroxides, ketone peroxides, nitriles, and alkyl peroxides.

32. A process according to claim 1, wherein said free radical generating initiator is selected from the group consisting of benzoyl peroxide, t-butyl hydroperoxide, and azobisisobutyrlonitrile.

* * * * *